(12) United States Patent
Rhee et al.

(10) Patent No.: US 8,003,204 B2
(45) Date of Patent: Aug. 23, 2011

(54) MICROPOROUS POLYOLEFIN MULTI LAYER FILM AND PREPARING METHOD THEREOF

(75) Inventors: Jang-Weon Rhee, Daejeon (KR); Inhwa Jung, Chungcheongnam-do (KR); Gwigwon Kang, Daejeon (KR); Youngkeun Lee, Seoul (KR)

(73) Assignee: SK Energy Co., Ltd., Seoul (KR)

( * ) Notice: Subject to any disclaimer, the term of this patent is extended or adjusted under 35 U.S.C. 154(b) by 245 days.

(21) Appl. No.: 12/318,167

(22) Filed: Dec. 23, 2008

(65) Prior Publication Data

US 2009/0169862 A1 Jul. 2, 2009

(30) Foreign Application Priority Data

Dec. 26, 2007 (KR) .................. 10-2007-0138028
Jan. 3, 2008 (KR) .................. 10-2008-0000711

(51) Int. Cl.
*B32B 3/26* (2006.01)
(52) U.S. Cl. ............... 428/316.6; 428/317.9; 428/315.5; 428/315.7
(58) Field of Classification Search ............... 428/316.6, 428/317.9, 315.5, 315.7
See application file for complete search history.

(56) References Cited

U.S. PATENT DOCUMENTS

| 4,247,498 A | 1/1981 | Castro |
| 5,480,745 A | 1/1996 | Nishiyama et al. |
| 5,641,565 A | 6/1997 | Sogo |
| 5,691,077 A | 11/1997 | Yu |
| 6,949,315 B1 | 9/2005 | Samii et al. |
| 2006/1005507 | 3/2006 | Hoshida et al. |
| 2006/0141351 A1 | 6/2006 | Suh |
| 2008/0118827 A1 | 5/2008 | Call et al. |
| 2009/0098450 A1* | 4/2009 | Kikuchi et al. ............... 429/145 |

FOREIGN PATENT DOCUMENTS

| EP | 1 942 000 A1 | 7/2008 |
| EP | 2 006 088 A1 | 12/2008 |
| GB | 2 298 817 A | 9/1996 |
| JP | 2003-321323 | 11/2003 |
| WO | 2004/089627 | 10/2004 |
| WO | 2006/038532 | 4/2006 |
| WO | 2007/049568 A1 | 5/2007 |

* cited by examiner

*Primary Examiner* — Hai Vo
(74) *Attorney, Agent, or Firm* — Clark & Brody

(57) ABSTRACT

The present invention relates to a multi-layered microporous polyolefin film for a battery separator and a method for preparing the same. The microporous multi-layered film of the present invention has a characteristics to have both the low shutdown temperature conferred by the polyethylene and the high melt fracture temperature conferred by the polypropylene and heat-resistant filler. In addition, it has the high strength and stability conferred by the micropores prepared under wet process and the high permeability and high strength conferred by the macropores prepared under dry process. Therefore, this multi-layered film can be used effectively to manufacture a secondary battery with high capacity and high power.

5 Claims, 2 Drawing Sheets

MICROPOROUS POLYOLEFIN MULTI LAYER FILM AND PREPARING METHOD THEREOF

CROSS-REFERENCE TO RELATED APPLICATION

This application claims priority under 35 U.S.C. §119 the benefit of Korean Patent Application No. 10-2007-0138028, filed on Dec. 26, 2007, and Korean Patent Application No. 10-2008-0000711, filed on Jan. 3, 2008, the entire contents of which are incorporated herein by reference.

BACKGROUND

1. Technical Field

The present invention relates to a microporous polyolefin multilayer film stable in quality and outstanding in thermal stability. More particularly, the present invention relates to a microporous film that has a feature to have both a low shutdown temperature caused by polyethylene and a high melt fracture temperature caused by polypropylene and a heat-resistant filler, as well as both uniform micropores and high strength/stability characterized in the separator prepared under wet process and high permeability and high strength characterized in the macropores prepared under dry process. Therefore, this multi-layered film can be used effectively to manufacture a secondary battery with a high capacity and high power.

2. Description of the Related Art

The microporous polyolefin film is widely used to manufacture battery separators, separating filters, membranes for microfiltration, and the like, because it is chemically stable and outstanding in physical properties.

The method for preparing a microporous film by using polyolefin is often accomplished under wet process. This procedure is comprised of the steps: mixing polyolefin and a diluent at high temperature to make a single phase; cooling to separate the polyolefin phase and the diluent phase; and then, extracting the diluent to generate pores in the polyolefin. The procedure can be applied to manufacture a thin film so that it is popularly used for high-capacity, high-power lithium ion secondary battery, and the like, due to the high strength and permeability, uniform pores and the evenness of quality.

General method for preparing the porous film by using wet process has been disclosed in U.S. Pat. No. 4,247,498. This method described the steps: selecting a diluent proper polyethylene; blending the mixture at high temperature to make a thermodynamically single-phase solution; and cooling to separate the polyolefin phase and the diluent phase so as to fabricate a porous film of the polyolefin.

The lithium ion secondary battery is an outstanding battery very high in the energy density, but is associated with the risk of explosion caused by short circuit. Therefore, a high level of quality is required for the separator with the evenness of quality. Further, as the application of the lithium ion secondary batteries is extended to hybrid cars and other fields, a stricter thermal stability requirement is required for the separator. When the thermal stability decreases, the battery may explode dangerously due to rupture separator when being overheated. It is because poor thermal stability of the separator may lead to overheating of the battery and explosion caused by melting and rupturing separators.

Thermal stability of separator in a battery is determined by shutdown temperature and melt down temperature.

Shutdown temperature is the temperature at which the micropores of the separator are closed to shut the electric current when the inside of the battery is abnormally overheated. Melt down temperature is the temperature at which the separator is subjected to melt and the electric current flows again when the battery temperature increases beyond the shutdown temperature. To ensure thermal stability of a battery, it is preferred that the shutdown temperature is low and the melt down temperature is high. Especially, the melt down temperature is closely related with the battery stability, because it shuts electric current continuously even under an explosive situation.

In order to improve the thermal stability of the separator, three kinds of approaches have been attempted. One is to add an inorganic material or heat-resistant resin to the polyethylene in order to increase the thermal stability of the separator. Another is to coat a heat resistant material on the surface. The other is to manufacture a multi-layered separator containing a heat resistant layer.

U.S. Pat. No. 6,949,315 discloses a method blending UHMW (ultra high molecular weight) polyethylene with 5-15 weight % of an inorganic material such as titanium oxide to improve thermal stability of the separator. However, this method is disadvantageous in that, although the addition of the inorganic material provides the effect of improving thermal stability, it may lead to poor mixing and nonuniform quality and formation of pinholes resulting therefrom, or poor film properties because of lack of compatibility at the interface between the inorganic material and the polymer resin. These disadvantages are inevitable in a separator using an inorganic material.

U.S. Pat. No. 5,641,565 discloses a method of blending a resin having superior heat resistance instead of using an inorganic material. In this method, the separator is manufactured by the steps: mixing polyethylene and 5 to 45 weight % polypropylene to make a resin mixture; mixing 30 to 75 weight % of an organic liquid material and 10 to 50 weight % of an inorganic material; and extracting the organic liquid material and the inorganic material. However, there still remains the problem associated with mixing the inorganic material as described above, even though the inorganic compound is extracted out. As already mentioned in the patent document, the addition of polypropylene which is not compatible with polyethylene leads to deterioration of physical properties. Further, this procedure is complicated due to the additional steps of extracting and removing the inorganic compound. It requires a lot of polypropylene in order to improve thermal stability and, thus, further deteriorates the physical property of the separator.

The method for coating a heat resistant material on the surface of a microporous film is disclosed in U.S. Patent Application No. 2006-0055075A1. Unfortunately, the coating system is restricted in increasing the permeability of the coating layer. As a consequence, the film has poor permeability and the wetting property between the coating layer and the microporous film is likely to be poor to cause unevenness of quality.

In order to improve the thermal stability of the separator, lamination is used to prepare a multi-layered separator. In U.S. Pat. No. 5,691,077, polyethylene outstanding in the shutdown property (i.e., low melting point) is laminated with polypropylene having a high melt down temperature (i.e., high melting point) to fabricate a 3-layer-structured separator. This separator is outstanding in the thermal property, but has a lot of disadvantages. In detail, this laminated separator is associated with nonuniform stretching, pinhole generation, increased deviation of thickness, and the like, because films are prepared through a low-temperature dry process. It lowers productivity because of the additional laminating step. Further, the separator may be delaminated due to poor adhesion strength. As a consequence, this method is not applied widely. In spite of superior thermal stability, this method does not satisfy the necessary requirements for the separator of a secondary battery, such as strength, permeability, uniform quality and productivity.

In Japanese Patent Laid-Open No. 2002-321323 and WO 2004/089627, the multi-layered separators that comprise a polyethylene microporous film prepared under wet process as a main layer and layer comprised of a mixture of polyethylene and polypropylene also prepared under a moisturized condition wet process as a surface layer, have been disclosed. These separators are outstanding in the quality stability, because they are manufactured under wet process, but are restricted in that they do not have a thermal stability better than that of the polypropylene resin. Furthermore, the processes for preparing a multi-layered separator become complicated because all the layers of the separator should be manufactured under wet process.

In WO 2006/038532, the multi-layered separator containing inorganic particles prepared under wet process has been introduced. This separator should be fabricated under wet process, as described above. In addition to a complicated blending process, this method is associated with the problem of deteriorated physical properties caused by the inclusion of the diluent, which has to be extracted out during film production, by more than 50% on the surface layer (Stretching performed in the presence of a diluent does not give desired effect).

In the separator of a secondary battery, the characteristics of strength, permeability and evenness of quality are essential, and, recently, superior thermal stability is also required. However, the conventional methods mentioned above cannot accomplish the requirements of strength, permeability, thermal stability and evenness of quality simultaneously to the level of the separator prepared under wet process.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the related art. The present inventors attempted to stretch the mixture of polypropylene and a heat-resistant filler having a higher meting temperature than the polypropylene without a diluent so that we prepared a porous film of the polypropylene and the heat-resistant filler as the interface is cracked to generate pore. Then, the porous film was laminated with an additional porous film prepared under wet process, in order to manufacture the novel porous film that satisfies the physical property and the quality stability of the polyethylene microporous film layer and the strength along with the permeability of the combined porous film layer of the polypropylene and the heat-resistant filler. Therefore, we have identified that the separator of the present invention should be outstanding in all of the strength, the permeability, evenness of quality and the thermal stability, and have completed the invention successfully.

BRIEF DESCRIPTION OF THE DRAWINGS

The above and other features of the present invention will now be described in detail with reference to certain example embodiments thereof illustrated in the accompanying drawings which are given hereinbelow by way of illustration only, and thus are not limitative of the present invention, and wherein.

DETAILED DESCRIPTION OF THE INVENTION

Figure 1:
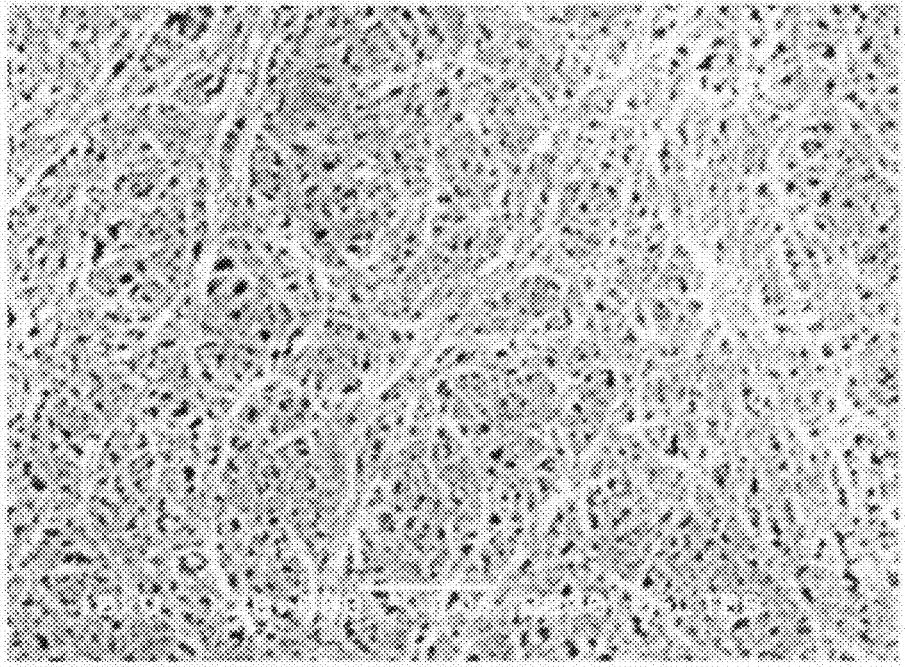
FIG. 1 is micropores fabricated by stretching and extracting after separating the phase of polyethylene and the diluent.

Hereinafter, reference will now be made in detail to various embodiments of the present invention, examples of which are illustrated in the accompanying drawings and described below. While the invention will be described in conjunction with example embodiments, it will be understood that the present description is not intended to limit the invention to those example embodiments. On the contrary, the invention is intended to cover not only the example embodiments, but also various alternatives, modifications, equivalents and other embodiments, which may be included within the spirit and scope of the invention as defined in the appended claims.

In one aspect, the present invention provides a microporous polyolefin multilayer film that is prepared by the process comprising steps:

(a) melting and mixing mixture that comprises 20-50 weight % of polyethylene having a melting temperature of 125° C. or higher and 80-50 weight % of a diluent;

(b) melting and mixing mixture that comprises 20-70 weight % of polypropylene having a melting temperature of 160° C. or higher and 80-30 weight % of a heat-resistant filler having a melting temperature of 170° C. or higher;

(c) forming the blended melt prepared in the (a) and (b) steps into a multi-layered sheet of 2 or 3 layers;

(d) forming a film by stretching the multi-layered sheet;

(e) extracting the diluent from the film; and (f) heat setting the film, wherein the pores of the polyethylene layer are micropores that are formed by stretching and extracting after separating the phase of polyethylene and the diluent and have an average size of 0.1 μm or smaller; and the pores of the polypropylene and heat-resistant filler layer are macropores that are fabricated by cracking of the interface between the polypropylene and heat-resistant filler and have an average size of 1-50 μm, and the microporous polyolefin multilayer film has thickness of 9-30 μm, a piercing strength of 0.15 N/μm or more, a permeability of $1.5 \times 10^{-5}$ Darcy or more and a melt fracture temperature of 170° C. or higher.

The basic principle of the present invention for preparing the microporous polyolefin multilayer film will be described as follows.

As described above, the method for preparing a microporous film by using polyethylene under wet process is comprised of steps: mixing polyethylene and its matching diluent; extruding to manufacture a sheet; stretching to form a film; and extracting the diluent by using an organic solvent to fabricate a porous film. However, because the melting temperature of the separator made of polyethylene cannot exceed 135° C., it is limited in thermal stability. In contrast, the melting temperature of polypropylene may be above 160° C. But, because of insufficient crystallinity, highly-permeable films cannot be made under wet process. Furthermore, the shutdown temperature is high due to the high melting temperature, which results in deteriorated safety (As Shutdown temperature is the temperature at which the micropores of the separator are closed to shut the electric current when the inside of the battery is abnormally overheated, the lower is the better). When being blended with polypropylene or a heat-resistant filler in order to overcome this problem, polyethylene can be improved for the thermal stability (i.e., increased melt fracture temperature) as described above. But, the heat-resistant material cannot increase the melt fracture temperature sufficiently because it exists in a particulate form and is not interconnected with the polyethylene matrix. Moreover, this material deteriorates the whole physical property due to weak interface with polyethylene.

Therefore, a polyethylene layer and a polypropylene or heat-resistant filler layer should be manufactured separately and then combined to form a multi-layered separator, rather than blending polyethylene and polypropylene or the heat-resistant filler. In this case, the polypropylene is continuously connected in the polypropylene and heat-resistant filler layer and the heat-resistant filler exists in the heat-resistant filler and polypropylene matrix in a particulate form. As a consequence, the porous film that has the low shutdown temperature of polyethylene, the high melting temperature of polypropylene and the good thermal stability of inorganic material along with high melt fracture temperature can be manufactured.

When the polypropylene and heat-resistant filler are simply mixed, they do not have permeability. In order to confer the permeability to the polypropylene and heat-resistant filler layer, the stretching process is applied during stretching of polyethylene under a moisturized condition, in the present invention. In detail, a sheet made of the mixture of polyethylene and a diluent and a sheet made of the mixture of polypropylene and a heat-resistant filler are combined to form a multi-layered sheet and stretched to crack the interface between polypropylene and heat-resistant filler in their mixture layer and to form pores. Thereafter, the diluent of the polyethylene layer is extracted out by the extracting process. As a consequence, the multi-layered microporous polyolefin film that has all the properties—the stability of polyethylene separator prepared under wet process, and the thermal stability, electrolytic impregnability, strength and permeability of the polypropylene and heat-resistant filler—is manufactured.

Figure 2:
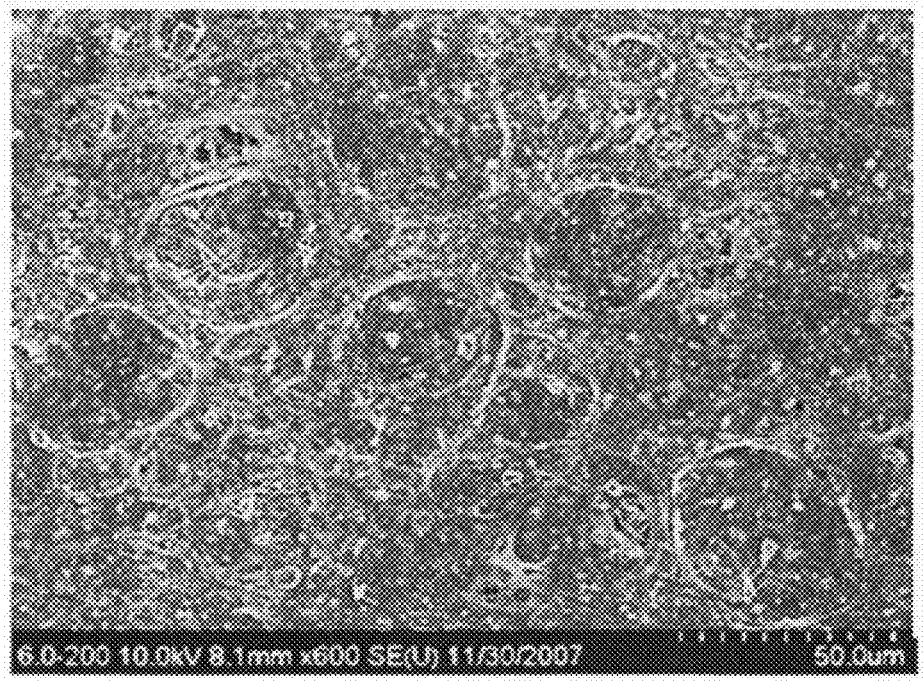
FIG. 2 is macropores fabricated by cracking the interface between polypropylene and heat-resistant filler.

The pores of the separator prepared above have following characteristics. The pores of the polyethylene layer are micropores formed by stretching and extracting after separating the phase of polyethylene and the diluent (see FIG. 1) and have an average size of 0.1 μm or smaller. The pores of the polypropylene and heat-resistant filler layer are macropores fabricated by cracking of the interface between polypropylene and the inorganic material (see FIG. 2) and have an average size of 1-50 μm.

In another aspect, the present invention provides a method for preparing a microporous polyolefin multilayer film which comprises steps:

(a) melting and mixing mixture that comprises 20-50 weight % of polyethylene having a melting temperature of 125° C. or higher and 80-50 weight % of a diluent;

(b) melting and mixing mixture that comprises 20-70 weight % of polypropylene having a melting temperature of 160° C. or higher and 80-30 weight % of a heat-resistant filler having a melting temperature of 170° C. or higher;

(c) forming the blended melt prepared in the (a) and (b) steps into a multi-layered sheet of 2 or 3 layers;

(d) forming a film by stretching the multi-layered sheet;

(e) extracting the diluent from the film; and (f) heat setting the film.

In the step (a) melting and mixing mixture that comprises 20-50 weight % of polyethylene having a melting temperature of 125° C. or higher and 80-50 weight % of a diluent, the polyethylene used in the invention is single or combined polyethylene comprising ethylene only or ethylene and $C_3$-$C_8$ α-olefin and having a melting temperature of 125° C. or higher. The combined polyethylene is a mixture of ethylene only or ethylene and $C_3$-$C_8$ α-olefin co-monomer, and has a melting temperature of 125° C. or higher. The $C_3$-$C_8$ α-olefin co-monomer may be propylene, 1-butene, 1-hexene, 4-methylpetene-1, and the like. The weight average molecular weight of the polyethylene is preferably 200,000-3,000,000. When the weight average molecular weight is under 200,000, the final physical property of the porous film becomes worse. When the weight average molecular weight is over 3,000,000, the productivity becomes lower because extruding and mixing property is worse. The weight average molecular weight is more preferably 200,000-1,500,000.

The diluent may be all kinds of organic liquids capable of forming a single phase with the resin at the temperature of extrusion. It may be an aliphatic or cyclic hydrocarbon such as nonane, decane, decalin, paraffin oil, etc. or a phthalic acid ester such as dibutyl phthalate and dioctyl phthalate, etc. The diluent may be paraffin oil that is nontoxic to human body, has a high boiling point and is low in volatile components, and preferably, the diluent may be paraffin oil having a kinetic viscosity of 20-200 cSt at 40° C. When the kinetic viscosity is over 200 cSt, the paraffin oil becomes problematic to increase load and deteriorate the surface of the sheet or film. Further, it may complicate the extraction process, decrease the productivity and reduce the permeability due to remained oil. When the kinetic viscosity is under 20 cSt, the paraffin oil is difficult to be mixed during the extrusion because it has a viscosity quite different from that of the melted polyethylene inside the extruder.

The composition of polyethylene and the diluent may be comprised of 20-50 weight % of polyethylene and 80-50 weight % of the diluent. When the content of polyethylene goes beyond 50 weight % (i.e., when the content of the diluent is under 50 weight %), the porosity, the pore size and the interconnection between pores decrease to drop down the permeability significantly. In contrast, when the content of polyethylene is under 20 weight % (i.e., when the content of diluent is over 80 weight %), the blending property of polyethylene and the diluent decreases so that they are not mixed thermodynamically to be extruded in a gel form. This sheet may result in rupture during stretching and nonuniform thickness.

If necessary, typical additives such as oxidation stabilizers, UV stabilizers, antistatics, etc. may be added in order to improve specific functions.

The mixture of polyethylene and the diluent may be melted and mixed by using a twin screw compounder, blender, Banbury mixer, etc. specially designed for the blending of the diluent with the polyethylene. The melting and mixing may be conducted at 180-300° C. The polyethylene and the diluent may be previously mixed and poured into an extruder, or poured separately from different feeders.

In the step (b) melting and mixing mixture that comprises 20-70 weight % of polypropylene having a melting temperature of 160° C. or higher and 80-30 weight % of a heat-resistant filler having a melting temperature of 170° C. or higher, the polypropylene is single or combined polypropylene comprising propylene only or propylene, ethylene and $C_4$-$C_8$ α-olefin having a melting temperature of 160° C. or higher. The combined polypropylene is a mixture of propylene only or propylene, ethylene and $C_4$-$C_8$ α-olefin and has a melting temperature of 160° C. or higher. The molecular weight of polypropylene may be 50,000-2,000,000. When the weight average molecular weight is under 50,000, the physical property of the porous film becomes bad although mixing performance with the inorganic material is good. When the weight average molecular weight is over 2,000,000, the extruding and mixing property becomes poor.

The heat-resistant filler plays the following three roles: First, the heat-resistant filler plays the role as nucleus to form pores at the interface during the stretching after being mixed with polypropylene. Second, the heat-resistant filler plays the role of increasing the thermal stability of the porous film. Third, the heat-resistant filler plays the role of improving electrolytic absorption because it has an outstanding affinity with the electrolyte solution due to its inherent polarity. The heat-resistant filler may be a polar heat-resistant resin selected among polyvinylidene fluoride, polymethylpentene, polyethylene terephthalate, polycarbonate, polyester, polyvinyl alcohol, polyacrylonitrile and polymethylene oxide. The heat-resistant filler may be an inorganic material having an average particle size of 0.01-5 μm and may be selected among silicon dioxide ($SiO_2$), aluminum oxide ($Al_2O_3$), calcium carbonate ($CaCO_3$), titanium dioxide ($TiO_2$), $SiS_2$, $SiPO_4$, MgO, ZnO, $BaTiO_3$, natural or organically modified clay and a mixture thereof.

With respect to the heat-resistance, the initial size of the polar heat-resistant resin is not an important factor because it is melted and mixed with polypropylene, but the particle size of the inorganic material is very important. The average particle size of the inorganic material may be 0.01-5 μm. When the average particle size is smaller than 0.01 μm, the pore size becomes smaller after stretching and is not suitable for the porous film. When the average particle size is larger than 5 μm, the pore size becomes larger after stretching so as to deteriorate the physical property of the porous film. Further, it may affect the whole physical property of the separator according to the present invention, which has a thickness of 9-30 μm.

The mixture of polypropylene and the heat-resistant filler may be comprised of 20-70 weight % of polypropylene and 80-30 weight % of the heat-resistant filler. When the content of polypropylene goes over 70 weight %, the number of pores generated during stretching decreases to drop down the permeability significantly. In contrast, when the content of polypropylene is under 20 weight %, the polypropylene cannot be interconnected in a matrix form, thereby decreasing the physical property of the porous film and failing to improve heat resistance. The volume ratio of polypropylene and the heat-resistant filler may be most effective at 50/50. When considering the higher density of the heat-resistant filler, the composition of polypropylene and heat-resistant filler may be 30 to 50 weight % of polypropylene and 70 to 50 weight % of the heat-resistant filler.

If necessary, typical additives such as oxidation stabilizers, UV stabilizers, electrostatics, etc. may be added in order to improve specific functions.

The mixture of polypropylene and heat-resistant filler may be melted and mixed by using a twin screw compounder, blender, Banbury mixer, etc. specially designed for the blending of the heat-resistant filler and the polyolefin. When the heat-resistant filler is a polar heat-resistant resin, the blending process may be conducted at 30-50° C. higher temperature than the melting temperature of the polar heat-resistant resin. When the blending temperature is lower than the temperature range, the polar heat-resistant resin may not be melted and blended sufficiently. In contrast, when the blending temperature is higher than the temperature range, the resin including polypropylene may be excessively thermally oxidized. The blending process may be conducted at 180-250° C., when the heat-resistant filler is an inorganic material. The polypropylene and the polar heat-resistant filler may be previously mixed and poured into a compounder, or poured separately from different feeders.

In the step (c) forming the blended melt prepared in the (a) and (b) steps into a multi-layered sheet of 2 or 3 layers, typical casting or calendaring methods may be used to form the melt into a sheet. The temperature of casting or calendaring roll may be 30-80° C. When the temperature of casting a roll is under 30° C., the sheet may generate wrinkles due to rapid cooling. In contrast, when the temperature of casting roll is above 80° C., the sheet may have poor surface due to insufficient cooling.

In order to form the multi-layered sheet, general co-extrusion method, heat adhesion method or coating method may be adopted. The co-extrusion method is a method for preparing a multi-layered sheet, in which two kinds of melt extruded from each extruder are co-extruded through a multi-layered T die to fabricate the multi-layered sheet. The heat adhesion method is a method for preparing a multi-layered sheet, in which sheets extruded from different extruders are heat adhered under pressure. The coating method is a method for preparing a multi-layered sheet, in which a first sheet is extruded over another sheet layer.

In the step (d) forming a film by stretching the multi-layered sheet, in order to stretch sheet, any kinds of stretching method may be used. For example, a tenter-type simultaneous stretching may be used, or a consecutive stretching of stretching first in the longitudinal direction using a roll and then stretching in the transverse direction using a tenter may be used. The stretch ratio may be more than 4 times in the longitudinal and transverse directions, respectively, and the total stretch ratio may be 25-60 times. When the stretch ratio of in one direction is less than 4 times, the physical property balance in the longitudinal and transverse directions is broken due to the insufficient stretching in one direction, and the puncture strength may decreases. When the total stretch ratio is less than 25 times, the stretching may be insufficient. In contrast, when the total stretch ratio exceeds 60 times, the film may be ruptured during the stretching the shrinkage ratio of the film may increase.

The stretching temperature may vary depending on the melting point of the polyethylene and the concentration and kinds of the diluent. The optimal temperature may be selected such that 30-80 weight % of the crystalline portion of the polyethylene and diluent layer in the multilayered sheet is melted. When the stretching temperature is lower than the temperature at which 30 weight % of the crystalline portion of the polyethylene and diluent layer within the multi-layered sheet is melted, the film may lack softness. As a consequence, the film may be ruptured during stretching or be stretched insufficiently. In contrast, when the stretching temperature is higher than the temperature range at which 80 weight % of the crystalline portion of the polyethylene and diluent layer within the multi-layered sheet is melted, the film is stretched easily but the variation of thickness increases due to partial over-stretching. Further, the physical property of the resin may be deteriorated due to insufficient orientation effect. The above-said stretching temperature is lower than the melting temperature of the polypropylene, but the polypropylene can be stretched at the temperature range. Through the stretching, the polypropylene is stretched without being ruptured to crack the interface between polyethylene and the heat-resistant filler. Simultaneously, pores are produced in the polypropylene and the heat-resistant filler layer.

Because the stretching can be attained without using a diluent, the stretching effect and the overall physical properties of the separator are improved.

The degree of melting of the crystalline portion can be analyzed by differential scanning calorimetry (DSC).

In the step (e) extracting the diluent from the film, the thin sheet prepared after the stretching, i.e., the film, is dried after extracting the diluent using an organic solvent. Any kind of organic solvent may be used if it can extract out the diluent used to extrude the resin. Suitable organic solvents include methyl ethyl ketone, methylene chloride, hexane, etc., which provide good extraction efficiency and are dried quickly. The extraction can be performed by any common solvent extraction method, including immersion, solvent spraying, ultrasonication, or the like, alone or in combination. The residual diluent content after the extraction should be not more than 1 weight %. If the residual diluent content exceeds 1 weight %, physical properties may be deteriorated and film permeability may decrease.

The amount of the residual diluent varies a lot depending on the extraction temperature and extraction time. A high extraction temperature is preferred when considering solubility of the diluent in the solvent. But, an extraction temperature of 40° C. or below is preferred when considering the safety issue associated with the boiling of the solvent. The extraction temperature should be higher than the solidification point of diluent because the extraction efficiency decreases remarkably if it is below the solidification point of diluent. The extraction time may vary depending on the film thickness. In case of a usual microporous film having a thickness of 9-30 µm, an extraction time of 2-4 minutes will be adequate.

In the step (f) heat setting the film, the film dried above is heat-set. That is, residual stress is removed so as to reduce the shrinkage ratio of the film. In the heat setting process, the film tending toward shrinkage is forcibly fixed, stretched or shrunk while heating so as to eliminate the residual stress. A higher heat-setting temperature is preferred with respect to lowering the shrinkage ratio. However, when the heat-setting temperature is excessively high, permeability may decrease because the micropores can be closed as the film is partially melted. Preferably, the heat-setting temperature is selected such that 10-70 weight % of the polyethylene crystalline portion of the film is melted. If the heat-setting temperature is lower than the temperature at which 10 weight % of the crystalline portion of the film is melted, the effect of the elimination of residual stress may be insignificant because the reorientation of the polyethylene molecules in the film is insufficient. And, if the heat-setting temperature is higher than the temperature at which 70 weight % of the crystalline portion of the film is melted, permeability may decrease because the micropores may be closed due to the partial melting.

The heat-setting time may be relatively short if the heat-setting temperature is high, and may be relatively long if the heat-setting temperature is low. When a tenter-type continuous heat-setting apparatus is used, a heat-setting time of 20 seconds to 2 minutes will be adequate. Most preferably, the heat-setting time may be 1-2 minutes in the temperature range where 10-30 weight % of the crystalline portion of the film is melted, and 20 seconds to 1 minute in the temperature range where 30-70 weight % of the crystalline portion of the film is melted.

The microporous polyolefin multilayer film manufactured by the above-described process will be described more clearly as follows.

The microporous polyolefin multilayer film is comprised of a polyethylene layer having a melting temperature of 125° C. or higher and a combined polypropylene and inorganic material layer comprising 20-70 weight % of polypropylene having a melting temperature of 160° C. or higher and 80-30 weight % of an heat resistant filler having a melting temperature of 160° C. or higher. It is a 2- or 3-layered microporous film. In case of a 3-layered film, the polyethylene layer may be a middle layer and the polypropylene and heat-resistant filler layer is both surface layers, and vice versa.

Preferably, the polyethylene layer may occupy more than 50% of the total thickness and the polypropylene and heat-resistant filler layer has a thickness of at least 1 µm. When the polyethylene layer occupies less than 50% of the total thickness, the separator, prepared under wet process, which has evenness of quality and physical property due to uniform pore size occupies less than 50% so that overall evenness of separator quality may be deteriorated. And, preferably, the polypropylene and heat-resistant filler layer which contributes to the improvement of thermal stability has a thickness of at least 1 µm. When the thickness is smaller than 1 µm, improvement of thermal stability may be insufficient.

The multi-layered microporous film of the present invention has a thickness of 9-30 µm, puncture strength of 0.15 N/µm or more and a permeability of $1.5 \times 10^{-5}$ Darcy or more, melt fracture temperature of 170° C. or more. When the thickness of the film is under 9 µm, the overall strength of the separator becomes weak so that this is not proper for the separator of a secondary battery. When the thickness of the film is over 30 µm, the permeability of the separator becomes low so that this is not proper for the separator of a secondary battery.

The puncture strength of the film may be more than 0.15 N/µm. When the puncture strength is below 0.15 N/µm, the piercing strength is so weak that the film is improper for the separator of a secondary battery. More preferably, the puncture strength of the film may be 0.2-0.5 N/µm.

The gas permeability of the film may be more $1.5 \times 10^{-5}$ Darcy or more. A gas permeability below $1.5 \times 10^{-5}$ Darcy is insufficient to manufacture a high-capacity, high power battery. More preferably, the gas permeability of the film may be $2.5\text{-}10.0 \times 10^{-5}$ Darcy.

The melt fracture temperature of the film varies depending upon the melting temperature of polypropylene and the content of the inorganic material and may be 170-220° C. Thermal stability test of a battery is usually performed at 150° C., but the temperature of a battery may increase higher when an internal short circuit occurs. Therefore, it is preferable that the melt fracture temperature of the film is 170° C. or higher.

The pores of the porous film prepared in the present invention exist in two forms. The pores of the polyethylene layer are micropores that are manufactured by stretching and extracting after separating the phase of polyethylene and the diluent and have an average size of 0.1 µm or smaller. When the average size is over 0.1 µm, the pores badly affect the overall safety and the stability of the film. Preferably, the micropores may have an average size of 0.01-0.1 µm. In contrast, the pores of the polypropylene and heat-resistant filler layer are macropores that are fabricated by cracking of the interface between the polypropylene and the heat resistant filler and have an average size of 1-50 µm. When the average size is smaller than 1 µm, the pores may reduce the permeability of the whole film. When the average size is larger than 50 µm, the pores may reduce the physical property of the film and drop down the thermal stability. The thermal stability can be maximized when the pores having an average size of 50 μm or smaller are uniformly distributed to form a stable network of polypropylene. The pores of the polypropylene and heat-resistant filler layer may have an average size of 1-20 μm more preferably.

The microporous multi-layered film of the present invention has a feature to have both the low shutdown temperature caused by the polyethylene and the high melt fracture temperature caused by the polypropylene and the heat-resistant filler. In addition, it has the high strength and stability conferred by the micropores prepared under wet process and the high permeability and high strength conferred by the macropores prepared under dry process. Therefore, this multi-layered film can be used effectively to manufacture a secondary battery with high capacity and high power.

EXAMPLES

The following examples illustrate the invention and are not intended to limit the same. The molecular weight and the distribution of molecular weights are measured by using a high-temperature GPC (gel permeation chromatography) system (Polymer Laboratory). The kinetic viscosity of the diluent is measured with CAV-4 Automatic Viscometer (Cannon). The sheets and the films are manufactured from raw materials by the following procedures.

Preparation of Films

Polyethylene and a diluent were melted and mixed with a twin screw compounder having Φ=46 mm. The mixing temperature was 180-240° C. The polyethylene was added with a main feeder and the diluent was poured into an extruder by using a side-feeder. The blended melt was extruded on the T-die and molded with a casting roll at 30° C. to have proper thickness.

Polypropylene and a heat-resistant filler were mixed and extruded with a twin screw compounder having Φ=30 mm. The mixing temperature was 220-330° C. The polypropylene and the heat-resistant filler were blended previously and poured into an extruder. The blended and extruded melt was extruded with another extruder on the T- die and molded with a casting roll at 30° C. to have proper thickness.

In order to prepare a multi-layered sheet, each sheet was laminated with a compression molder with heat. The adhesion temperature was 200° C. and the heat fusion period was 30 seconds.

In order to analyze the melting phenomenon of the crystalline portion of the molded sheet according to temperatures, DSC (Mettler Toledo) was used. The analytic condition was: sample weight=5 mg; and scanning rate=10° C./min.

Sheets were simultaneously stretched with a tenter-type lab stretcher, while varying the stretching ratio and stretching temperature. The stretching temperature was determined in the temperature range where 30-80 weight % of crystalline portion of the polyethylene and diluent layer were melted, as determined by DSC.

The diluent was extracted out for 5 minutes using methylene chloride by the immersion method.

Heat setting was performed in a convection oven, after the extracted film was dried and fixed on a frame. The heat setting was conducted at 120° C. for 1 minute and 30 seconds.

The thickness of each film layer was measured with a scanning electron microscope (SEM). The prepared film was cooled under a liquid nitrogen condition for 20 seconds, then ruptured instantly and observed on the cross-section so as to measure the thickness.

The average size of the pores in each layer was measured by the following two procedures. In order to measure the pore size of the polyethylene and diluent layer, a singlelayer film was manufactured under the same condition and measured with a porometer (PMI) by using the half-dry method according to ASTM F316-03. The pore size of the polypropylene and heat-resistant filler layer was measured by observing the film surface with an electron microscope. The film manufactured above was examined to measure the most important properties for a microporous film, that is, the puncture strength, gas permeability and melt fracture temperature. The result is summarized in Table 1.

Measurement of Physical Properties (1) The puncture strength was a strength of the film when it was pierced by a pin having a diameter of 1.0 mm at a speed of 120 mm/min.

(2) The gas permeability was measured with a porometer (PMI, CFP-1500-AEL). The gas permeability is usually denoted with Gurley number, but the Gurley number is inconvenient in finding out the relative permeability associated with the pore structure of the separator itself, because it does not consider the effect by the thickness of the separator. To avoid this problem, Darcy's permeability constant was used, instead. Darcy's permeability constant is calculated by the following Equation 1. Nitrogen was used for the measurement.

$$C=(8\ FTV)/[\pi D^2(P^2-1)] \qquad \text{Equation 1}$$

where
C=Darcy's permeability constant,
F=flow rate,
T=sample thickness,
V=viscosity of gas (0.185 for $N_2$),
D=sample diameter, and
P=pressure.

In the present description, an average of Darcy's permeability constant in the region 100-200 psi was used.

Figure 3:
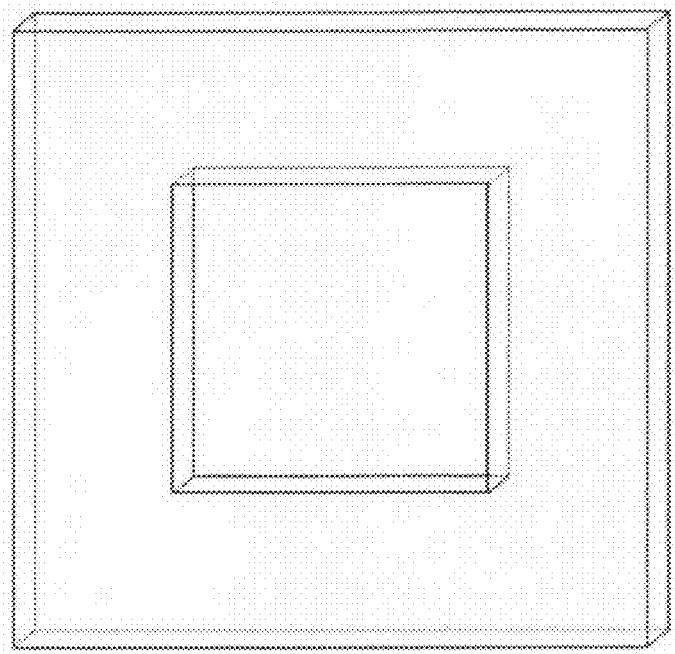
FIG. 3 is a frame having an outer size of 7.5 cm×7.5 cm and an inner size of 2.5 cm×2.5 cm to measure melt down temperature.
Figure 4:
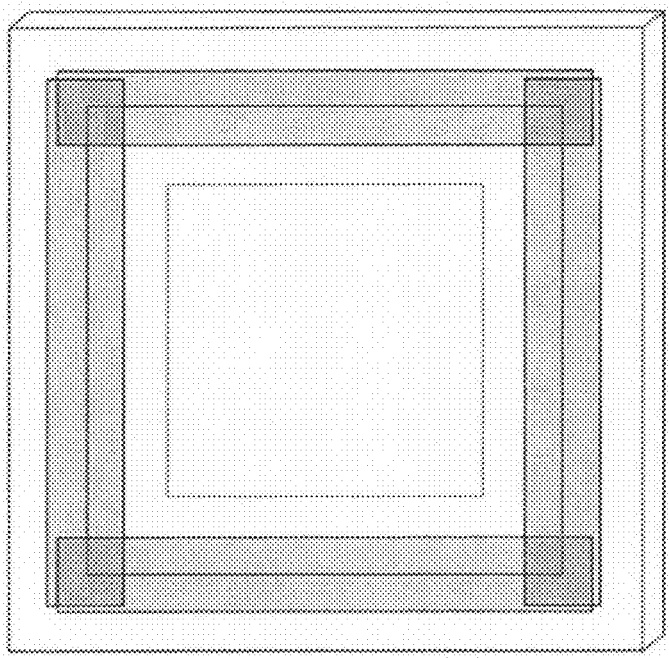
FIG. 4 is a film having a size of 5 cm×5 cm installed at frame of FIG. 3.

(3) In order to measure the melt fracture temperature of the film, the film (5 cm×5 cm, FIG. 4) was fixed on a frame (outer size=7.5 cm×7.5 cm; inner size=2.5 cm×2.5 cm, FIG. 3) using a polyimide tape, and allowed to stand for 10 minutes in a convection oven maintained at a preset temperature. It was observed whether the film was ruptured or not. The melt fracture temperature was defined as the highest temperature at which the film was not ruptured even after 10 minutes.

Example 1

In layer 1, polyethylene having a weight average molecular weight of $3.0 \times 10^5$ and a melting temperature of 134° C. and paraffin oil having a kinetic viscosity of 95 cSt at 40° C. were used, and the proportion of the two components was 30 weight % and 70 weight %, respectively. The thickness of the layer 1 sheet prepared above was 950 μm. In layer 2, polypropylene having a weight average molecular weight of $5.7 \times 10^5$ and a melting temperature of 163° C. and $CaCO_3$ having an average particle size of 1.5 μm were used, and the proportion of the two components was 50 weight % and 50 weight %, respectively. The thickness of the layer 2 sheet prepared above was 100 μm.

The layers 1 and 2 were heat fused and stretched simultaneously at 119° C. to a total stretching ratio of 36 times, 6 times in the longitudinal direction and 6 times in the transverse direction. The film thickness was 22 μm after the extraction and heat setting of the film.

Example 2

In layer 1, polyethylene having a weight average molecular weight of $2.7 \times 10^5$ and a melting temperature of 130° C.

because of using propylene as co-monomer and paraffin oil having a kinetic viscosity of 95 cSt at 40° C. were used, and the proportion of the two components was 30 weight % and 70 weight %, respectively. The thickness of the layer 1 sheet prepared above was 1,000 μm. In layer 2, polypropylene having a weight average molecular weight of $2.5 \times 10^5$ and a melting temperature of 1 60° C. because of using ethylene as co-monomer and $SiO_2$ having an average particle size of 3.0 μm were used, and the proportion of the two components was 30 weight % and 70 weight %, respectively. The thickness of the layer 2 sheet prepared above was 90 μm.

The layers 1 and 2 were heat fused and stretched simultaneously at 119° C. to a total stretching ratio of 49 times, 7 times in the longitudinal direction and 7 times in the transverse direction. The film thickness was 17 μm after the extraction and heat setting of the film.

Example 3

In layer 1, polyethylene having a weight average molecular weight of $3.0 \times 10^5$ and a melting temperature of 134° C. and paraffin oil having a kinetic viscosity of 95 cSt at 40° C. were used, and the proportion of the two components was 30 weight % and 70 weight %, respectively. The thickness of the layer 1 sheet prepared above was 700 μm. In layer 2, polypropylene having a weight average molecular weight of $2.5 \times 10^5$ and a melting temperature of 163° C. and polymethylpentene were used, and the proportion of the two components was 70 weight % and 30 weight %, respectively. The thickness of the layer 2 sheet prepared above was 220 μm.

The layers 1 and 2 were heat fused and stretched simultaneously at 122° C. to total stretching ratio of 36 times, 6 times in the longitudinal direction and 6 times in the transverse direction. The film thickness was 20 μm after the extraction and heat setting of the film.

Example 4

In layer 1, polyethylene having a weight average molecular weight of $2.7 \times 10^5$ and a melting temperature of 130° C. because of using propylene as co-monomer and paraffin oil having a kinetic viscosity of 95 cSt at 40° C. were used, and the proportion of the two components was 50 weight % and 50 weight %, respectively. The thickness of the layer 1 sheet prepared above was 340 μm. In layer 2, polypropylene having a weight average molecular weight of $5.7 \times 10^5$ and a melting temperature of 163° C. and polycarbonate were used, and the proportion of the two components was 60 weight % and 40 weight %, respectively. The thickness of the layer 2 sheet prepared above was 35 μm.

The layers 1 and 2 were heat fused and stretched simultaneously at 122° C. to a total stretch ratio of 25 times, 5 times in the longitudinal direction and 5 times in the transverse direction. The film thickness was 12 μm after the extraction and heat setting of the film.

Example 5

In layer 1, polyethylene having a weight average molecular weight of $3.0 \times 10^5$ and a melting temperature of 134° C. and paraffin oil having a kinetic viscosity of 95 cSt at 40° C. were used, and the proportion of the two components was 20 weight % and 80 weight %, respectively. The thickness of the layer 1 sheet prepared above was 2,000 μm. In layer 2, polypropylene having a weight average molecular weight of $2.5 \times 10^5$ and a melting temperature of 163° C. and $BaTiO_3$ having an average particle size of 0.4 μm were used, and the proportion of the two components was 20 weight % and 80 weight %, respectively. The thickness of the layer 2 sheet prepared above was 80 μm.

The layers 1 and 2 were heat fused to make a 3-layered structure in the order of layer 2, layer 1 and layer 2, and stretched simultaneously at 122° C. to a total stretching ratio of 49 times, 7 times in longitudinal direction and 7 times in the transverse direction. The film thickness was 30 μm after the extraction and heat setting of the film.

Comparative Example 1

In layer 1, polyethylene having a weight average molecular weight of $3.0 \times 10^5$ and a melting temperature of 134° C. and paraffin oil having a kinetic viscosity of 95 cSt at 40° C. were used, and the proportion of the two components was 30 weight % and 70 weight %, respectively. The thickness of the layer 1 sheet prepared above was 1,100 μm.

The layer 1 was stretched simultaneously at 120° C. to a total stretching ratio of 36 times, 6 times in the longitudinal direction and 6 times in the transverse direction. The film thickness was 20 μm after the extraction and heat setting of the film.

Comparative Example 2

In layer 1, polyethylene having a weight average molecular weight of $3.0 \times 10^5$ and a melting temperature of 134° C. and paraffin oil having a kinetic viscosity of 95 cSt at 40° C. were used, and the proportion of the two components was 60 weight % and 40 weight %, respectively. The thickness of the layer 1 sheet prepared above was 500 μm. In layer 2, polypropylene having a weight average molecular weight of $2.5 \times 10^5$ and a melting temperature of 163° C. was used alone. The thickness of the layer 2 sheet prepared above was 200 μm.

The layers 1 and 2 were heat fused and stretched simultaneously at 116° C. to a total stretch ratio of 36 times, 6 times in the longitudinal direction and 6 times in the transverse direction. The film thickness was 18 μm after the extraction and heat setting of the film.

Comparative Example 3

In layer 1, polyethylene having a weight average molecular weight of $3.0 \times 10^5$ and a melting temperature of 134° C., $CaCO_3$ having an average particle size of 1.5 μm and paraffin oil having a kinetic viscosity of 95 cSt at 40° C. were used. The mixture was mixed and extruded with a twin screw compounder having Φ=46 mm at 180-240° C. The polyethylene and the $CaCO_3$ were previously mixed and poured into an extruder. The paraffin oil was injected into the extruder by using a side-feeder. The proportions of the three components were: 21 weight % polyethylene, 9 weight % $CaCO_3$ and 70 weight % paraffin oil. The blended melt was extruded on the T-type die and molded with a casting roll into a sheet having a thickness of 450 μm.

In layer 2, polypropylene having a weight average molecular weight of $5.7 \times 10^5$ and a melting temperature of 163° C. and polyethylene having a weight average molecular weight of $3.0 \times 10^5$ and a melting temperature of 134° C. were used. The mixture was blended and extruded with a twin screw compounder having Φ=46 mm at 180-240° C. The polypropylene and the polyethylene were previously mixed and poured into the extruder. The proportion of the two components was 80 weight % and 20 weight %, respectively. The thickness of the layer 2 sheet prepared above was 480 μm.

The layers 1 and 2 were heat fused and stretched simultaneously at 120° C. to a total stretching ratio of 36 times, 6 times in the longitudinal direction and 6 times in the transverse direction. The film thickness was 22 μm after the extraction and heat setting of the film.

Comparative Example 4

In layer 1, polyethylene having a weight average molecular weight of $2.7 \times 10^5$ and a melting temperature of 130° C. because of using propylene as co-monomer and paraffin oil having a kinetic viscosity of 95 cSt at 40° C. were used, and the proportion of the two components was 30 weight % and 70 weight %, respectively. The thickness of the layer 1 sheet prepared above was 180 μm. In layer 2, polypropylene having a weight average molecular weight of $2.0 \times 10^5$ and a melting temperature of 132° C. because of using ethylene and 1-butene as co-polymer and $SiO_2$ having an average particle size of 5.5 μm were used. The proportion of the two components was 50 weight % and 50 weight %, respectively. The thickness of the layer 2 sheet prepared above was 230 μm.

The layers 1 and 2 were heat fused and stretched simultaneously at 118° C. to a total stretching ratio of 24.5 times, 7 times in the longitudinal direction and 3.5 times in the transverse direction. The film thickness was 15 μm after the extraction and heat setting of the film.

Comparative Example 5

In layer 1, polyethylene having a weight average molecular weight of $1.5 \times 10^5$ and a melting temperature of 121° C. because of using 1-butene as co-monomer and paraffin oil having a kinetic viscosity of 95 cSt at 40° C. were used, and the proportion of the two components was 30 weight % and 70 weight %, respectively. The thickness of the layer 1 sheet prepared above was 750 μm. In layer 2, polypropylene having a weight average molecular weight of $2.5 \times 10^5$ and a melting temperature of 163° C. and polycarbonate were used, and the proportion of the two components was 10 weight % and 90 weight %, respectively. The thickness of the layer 2 sheet prepared above was 25 μm.

The layers 1 and 2 were heat fused and heating, then tried to be stretched at 110-120° C. But, stretching was impossible because rupture occurred.

TABLE 1

|  |  | Ex. 1 | Ex. 2 | Ex. 3 | Ex. 4 | Ex. 5 |
|---|---|---|---|---|---|---|
| Layer 1 | Resin (Tm, ° C.) | PE(134) | PE(130) | PE(134) | PE(130) | PE(134) |
| Layer 2 | Resin (Tm, ° C.) | PP(163) | PP(160) | PP(163) | PP(163) | PP(163) |
|  | Filler (size, μm) | $CaCO_3$(1.5) | $SiO_2$(3.0) | PMP | PC | $BaTiO_3$(0.4) |
|  | Resin/filler (wt %/wt %) | 50/50 | 30/70 | 70/30 | 60/40 | 20/80 |
| Structure |  | Layer1/2 | Layer1/2 | Layer1/2 | Layer1/2 | Layer2/1/2 |
| Total thickness (μm) |  | 22 | 17 | 20 | 12 | 30 |
| PE layer | Thickness ratio (%) | 81 | 82 | 58 | 85 | 89 |
|  | Pore size (μm) | 0.024 | 0.028 | 0.032 | 0.015 | 0.038 |
| PP/filler layer | Thickness (μm) | 4.2 | 3.1 | 8.4 | 1.8 | 3.3 |
|  | Pore size (μm) | 25 | 38 | 22 | 15 | 4 |
| Puncture strength (N/μm) |  | 0.25 | 0.22 | 0.15 | 0.19 | 0.21 |
| Permeability ($10^{-5}$ Darcy) |  | 1.9 | 2.7 | 3.4 | 1.6 | 3.5 |
| Melt fracture temperature (° C.) |  | 177 | 173 | 175 | 170 | 179 |

PE: polyethylene;
PP: polypropylene;
PMP: polymethylpentene;
PC: polycarbonate;
Tm: melting temperature.

TABLE 2

|  |  | Comp. Ex. | | | | |
|---|---|---|---|---|---|---|
|  |  | Comp. Ex. 1 | Comp. Ex. 2 | Comp. Ex. 3 | Comp. Ex. 4 | Comp. Ex. 5 |
| Layer 1 | Resin (Tm, ° C.) | PE(134) | PE(134) | PE(134) | PE(130) | PE(121) |
|  | Filler (size, μm) | — | — | $CaCO_3$ (1.5) | — | — |
|  | Resin/filler (wt %/wt %) | — | — | 70/30 | — | — |
| Layer 2 | Resin (Tm, ° C.) | — | PP(163) | PP(163) PE(134) | PP(132) | PP(163) |
|  | Filler (size, μm) | — | — | — | $SiO_2$ (5.5) | PC |

TABLE 2-continued

|  |  | Comp. Ex. 1 | Comp. Ex. 2 | Comp. Ex. 3 | Comp. Ex. 4 | Comp. Ex. 5 |
|---|---|---|---|---|---|---|
|  | Resin/filler (wt %/wt %) | — | — | PP/PE = 80/20 | 50/50 | 10/90 |
| Structure |  | Layer1 | Layer1/2 | Layer1/2 | Layer1/2 | Layer1/2 Stretching impossible |
| Total thickness (μm) |  | 20 | 18 | 22 | 15 | — |
| PE layer | Thickness ratio (%) | 100 | 71 | 42 | 31 | — |
|  | Pore size (μm) | 0.025 | 0.01 | 2.8 | 0.042 | — |
| PP/filler layer | Thickness (μm) | — | 5.3 | 12.8 | 10.3 | — |
|  | Pore size (μm) | — | No pore | 18 | 12 | — |
| Puncture strength (N/μm) |  | 0.24 | 0.32 | 0.07 | 0.05 | — |
| Permeability ($10^{-5}$ Darcy) |  | 2.0 | — | 1.2 | 3.2 | — |
| Melt fracture temperature (° C.) |  | 135 | 165 | 165 | 137 | — |

PE: polyethylene;
PP: polypropylene;
Tm: melting temperature.

The invention has been described in detail with reference to preferred embodiments thereof. However, it will be appreciated by those skilled in the art that changes may be made in these embodiments without departing from the principles and spirit of the invention, the scope of which is defined in the accompanying claims and their equivalents.

What is claimed is:

1. A microporous polyolefin multilayer film comprising a polyethylene layer comprising a polyethylene having a melting temperature of 125° C. or higher, and a polypropylene and heat-resistant layer comprises 20-60 wt % of propylene having a melting temperature of 160° C. or higher and 80-40 wt % of a heat-resistant resin having a melting temperature of 170° C. or higher, wherein the film has a thickness of 9-30 μm, a piercing strength of 0.15 N/μm or more, a permeability of $1.5 \times 10^{-5}$ Darcy or more and a melt fracture temperature of 170° C. or higher, in which the pores of the polyethylene layer are micropores that are fabricated by stretching and extracting after separating the phase of polyethylene and the diluent and have an average size of 0.1 μm or smaller; and the pores of the polypropylene and heat-resistant layer are macropores that are fabricated by cracking of the interface between the polypropylene and heat-resistant resin and have an average size of 1-50 μm.

2. The microporous polyolefin multilayer film according to claim 1, where in the polyethylene is single or combined polyethylene comprising ethylene only or ethylene and C3-C8 α-olefin and having a melting temperature of 125° C. or higher; the polypropylene is single or combined polypropylene comprising propylene only or propylene, ethylene and C4-C8 α-olefin having a melting temperature of 160° C. or higher; and the heat-resistant resin having a melting temperature of 170° C. or higher is a resin selected among polyvinylidene fluoride, polymethylpentene, polyethylene terephthalate, polycarbonate, polyester, polyvinyl alcohol, polyacrylonitrile and polymethylene oxide.

3. The microporous polyolefin multilayer film according to claim 1, wherein the polyethylene layer occupies more than 50% of the total thickness and the polypropylene and heat-resistant layer has a thickness of at least 1 μm.

4. The microporous polyolefin multilayer film according to claim 1, wherein the film has a thickness of 9-30 μm, a piercing strength of 0.2 N/μm or more and a permeability of $2.5 \times 10^{-5}$–$10.0 \times 10^{-5}$ Darcy.

5. The microporous polyolefin multilayer film according to claim 1, wherein the polypropylene and heat resistant layer further comprises an inorganic material that has an average particle size of 0.01-5 μm and is selected among silicon dioxide ($SiO_2$), aluminum oxide ($Al_2O_3$), calcium carbonate ($CaCO_3$), titanium dioxide ($TiO_2$), $SiS_2$, $SiPO_4$, MgO, ZnO, $BaTiO_3$, natural or organically modified clay, and a mixture thereof.

* * * * *